Aug. 12, 1952     F. E. NIXON     2,606,591

TIRE CHAIN

Filed July 28, 1949

Francis E. Nixon
INVENTOR.

BY *Clarence A. O'Brien*
*and Harvey B. Jacobson*
Attorneys

Patented Aug. 12, 1952

2,606,591

UNITED STATES PATENT OFFICE 2,606,591

TIRE CHAIN

Francis E. Nixon, Ogallah, Kans.

Application July 28, 1949, Serial No. 107,301

2 Claims. (Cl. 152—242)

This invention relates to a tire chain and has for its primary object to provide a chain which can be readily attached to the tire with a minimum of time and effort, which is relatively simple in design and construction, cheap to manufacture in large quantities, and which is efficient for its intended purpose.

Another object of the invention is to provide a tire chain having resilient circumferential side rings interconnected by metallic, cross link chains, the side rings including protuberances to prevent the cross chains from bunching up.

Yet another object of the invention is to provide a novel flexible fastener for removably joining the split or free ends of the resilient side rings, the fastener being also capable of taking up the slack when any of the side rings have become unduly stretched.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 1:
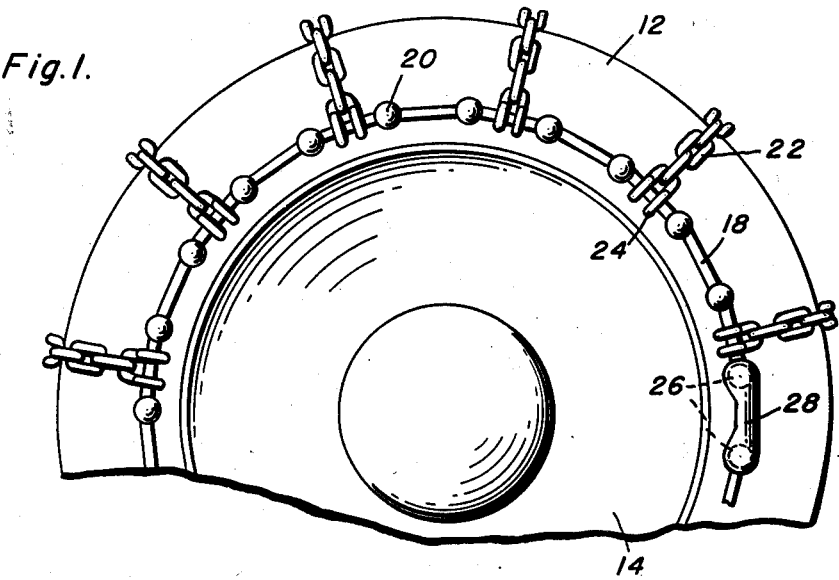
Figure 1 is a side elevational view of the chain shown attached to a tire.
Figure 2:
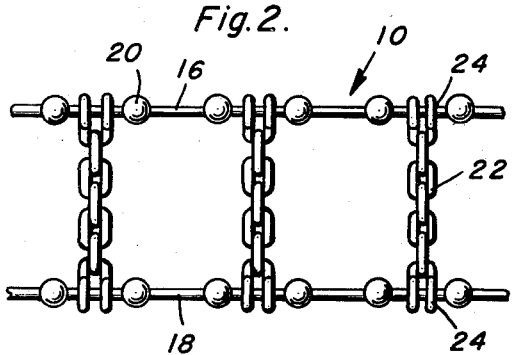
Figure 2 is a fragmentary top plan view of the chain.
Figure 5:
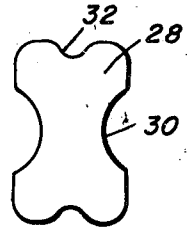
Figure 5 is a plan view of the fastener.

The invention is indicated at 10 and is a tire chain to be attached to tire 12 of a wheel 14 of any vehicle. The tire chain comprises a pair of circumferential side rings 16 and 18 which are fabricated of a resilient material such as rubber. Each side ring includes spaced protuberances 20 which are preferably also resilient and integral with the side ring and which may be of any desired size or shape although spherical knobs are preferred.

Between corresponding or aligned protuberances, a plurality of spaced cross chains 22 are attached which straddle the tire and interconnect the two side rings 16 and 18. These cross chains are metallic link chains having eye portions 24 at their ends to receive the opposing side rings, the cross chains lying between the aligned protuberances 20 to prevent them from bunching up.

Each side ring is split to provide free ends having protuberances 26 thereat. To removably attach or fasten the free ends together, a fastening member is provided which consists of a flexible metallic elongated plate 28 which has relatively wide notches 30 at its sides and narrower notches 32 at its ends. The plate is made to straddle the protuberances 26 and is bent down to form what amounts to a split-sleeve firmly gripping the protuberances at its ends, the notches 32 engaging the reduced portions of the side ring 18 adjacent these protuberances.

Figure 3:
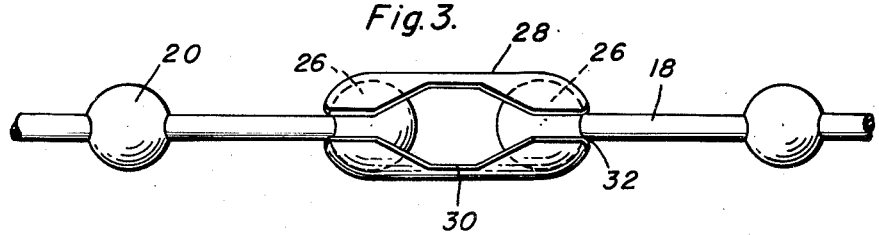
Figure 3 is an elevational view of a portion of a side ring illustrating the manner of fastening the free ends thereof.
Figure 4:
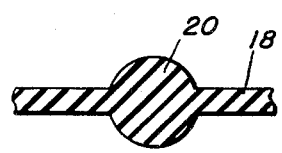
Figure 4 is a fragmentary sectional view through a side ring.

In use, the chain 10 is mounted on the tire 12 in the usual fashion. The free end knobs 26 are attached to each other by means of the flexible fastener 28 in the manner shown in Figure 3. The fastener can be readily opened by gripping the plate with a tool at the larger notches 30. Thus the chain is mounted and demounted quickly and effortlessly. It will be understood that the fastening plate 28 can be made to engage any pair of adjacent knobs on the side rings to take up slack produced in the side rings by undue stretching after long use.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A tire chain comprising a pair of circumferential side rings composed of rubber, each of said side rings having free ends and including spaced protuberances intermediate the ends, cross metallic link chains interconnecting the side rings, said cross chains gripping said side rings between the protuberances thereof, and a link means for removably securing the ends of each side ring, said link means being of the form adapted to engage a pair of spaced protuberances to take up slack formed from excessive stretching.

2. A tire chain comprising a pair of circumferential side rings composed of rubber, each of said side rings having free ends and including spaced protuberances intermediate the ends, cross metallic link chains interconnecting the side rings, said cross chains gripping said side rings between the protuberances thereof, and a link means for removably securing the ends of each side ring, said side rings terminating with protuberances, said link means including an elongated flexible metallic split sleeve engageable with said terminal protuberance or with intermediate pairs of spaced protuberances for reducing the slack formed from excessive stretching.

FRANCIS E. NIXON.

REFERENCES CITED

The following references are of record in the file of this patent:

UNITED STATES PATENTS

| Number | Name | Date |
|---|---|---|
| 1,380,244 | Otis | May 31, 1921 |
| 1,397,182 | Rollins | Nov. 15, 1921 |
| 1,419,043 | Gray | June 6, 1922 |
| 1,936,323 | Bowen | Nov. 21, 1933 |
| 2,444,573 | Mank | July 6, 1948 |

FOREIGN PATENTS

| Number | Country | Date |
|---|---|---|
| 684,557 | Germany | Nov. 30, 1939 |